(No Model.)
F. J. DUTCHER.
SPEEDER FOR SPINNING.
No. 332,194. Patented Dec. 8, 1885.
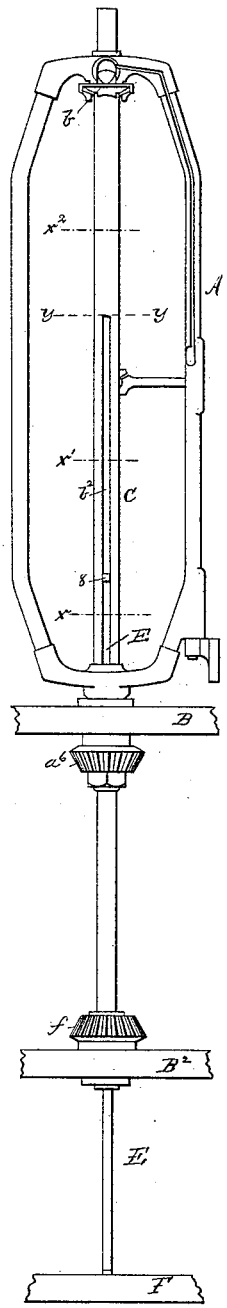
Fig:1.
Fig:2.
Fig:3.
Fig:4.
Witnesses.
Arthur Lippitten.
Henry Marsh.
Inventor.
Frank J. Dutcher.
by Crosby & Gregory attys.

UNITED STATES PATENT OFFICE.

FRANK J. DUTCHER, OF HOPEDALE, MASSACHUSETTS, ASSIGNOR TO THE HOPEDALE MACHINE COMPANY, OF SAME PLACE.

SPEEDER FOR SPINNING.

SPECIFICATION forming part of Letters Patent No. 332,194, dated December 8, 1885.

Application filed April 14, 1884. Serial No. 127,814. (No model.)

*To all whom it may concern:*

Be it known that I, FRANK J. DUTCHER, of Hopedale, county of Worcester, State of Massachusetts, have invented an Improvement in Speeders for Spinning, of which the following description, in connection with the accompanying drawings, is a specification, like letters on the drawings representing like parts.

In the class of speeder represented in United States Patents Nos. 317,323 and 228,809 the quill which is surrounded by the heavy spool is composed of a tube the walls of which are of uniform thickness, one side of the tube being slotted for a part of its length, to permit the passage therethrough of a flattened lateral projection forming part of a spindle, the said projection engaging the interior of and rotating the spindle, and at the same time rotating the quill, the slot in the quill being of a length fully equal to the length of the traverse of the spindle.

Seamless tubes such as referred to are quite expensive, and up to the present time those used for quills are foreign made.

In operation it has been found that a quill made simply as a tube the walls of which are of uniform thickness fails to possess the requisite amount of stiffness or rigidity which it is absolutely necessary that the quill should have in order to enable it and its surrounding bobbin to be rotated with the spindle at high speed, for unless the quill is very stiff it bends under the centrifugal strain of an unevenly-loaded spool or bobbin, such bending resulting in the production of poor and uneven yarn, both in size and strength.

To enable a quill to be practically employed and its many great advantages to be made available in the manufacture of yarn, it becomes necessary and extremely desirable to make a quill which shall be sufficiently rigid not to bend or spring aside, owing to centrifugal action. The stiffness of the usual tubular quill is determined by the thickness of the metal of which it is composed; but to increase the stiffness of the tube made in usual manner to the required extent to prevent it from yielding or springing, as described, is not practicable, for by so doing the diameter of the tubular quill would be greater than the established bore of spindles and bobbins.

To obviate the difficulties resulting from injurious or excessive springing of the quill, and to produce a stiffer quill without increasing its diameter, I make the quill from a solid bar of stiff steel, which bar is slotted for the reception of a flat spindle such as is referred to in the said application, the said solid quill for a part of its length being also slotted completely through from side to side, to permit it to be turned outward from the flier, even when the bobbin-driving projection of the flat spindle is turned away from the operator.

Figure 1, in elevation, represents a speeder spindle and flier and rails to hold them such as fully described in the said application, and Figs. 2, 3, and 4 are cross-sections of my improved quill on the lines $x$ $x'$ $x^2$, respectively.

The flat spindle E, the flier A, the latch $b$, the rails B, $B^2$, and F, and means for operating them are all as common to the said application, and are not herein claimed.

My improved quill C is made from a solid rod of stiff steel slotted for the reception of a flat spindle, preferably from side to side diametrically, as shown in section, Fig. 2, from its lower end upward for a distance a little greater than the distance which the flat spindle E extends into the quill when the parts are in the position Fig. 1, or in what is called the "lowest" position of the traverse.

Heretofore the lower end of the quill has only been grooved, not slotted, and the quill could be tipped out from the flier only when the projection 8 of the flat spindle E and the single slot in the quill were toward the operator; but by slotting the spindle, as described, and shown best at $a$, Fig. 2, the quill may be tipped out both when the said projection is directly toward and also directly away from the front of the machine or the operator. From below the line $y$ $y$ to its lower end the quill is grooved at one side only, as shown best in Fig. 3, and above the line $z$ $z$ the quill is solid. The groove $b^2$ extends along the quill for a sufficient distance to permit the spindle to rest therein when at the highest point of its traverse.

The quill described is very stiff, will not bend or spring by centrifugal action, is stronger and stiffer than the seamless-tube quill, and is not so easily sprung or set out of true by careless handling, and at the same time is much cheaper than the tube. The quill is supported at both ends within the flier, and is rotated by the spindle, which latter is positively rotated, and the quill may be tipped laterally out of the flier for the removal from the spindle or the application thereto of a spool or bobbin without removing the driving-band, all substantially as described in United States Patent No. 317,323, herein referred to.

I am aware that a positively-rotated spindle made as a tube slotted at one side has received within it a rod having a lateral projection which extended through the slot in the spindle and engaged a spool, the said rod deriving its movement of rotation entirely from the tubular slotted spindle, and not itself being rotated to rotate the spool.

In my invention the quill is rotated by the spindle.

I claim—

The flier and flat spindle provided with a bobbin-engaging projection, 8, combined with a solid quill grooved at one side for a part of its length and slotted from side to side for another part of its length, as and for the purpose set forth.

In testimony whereof I have signed my name to this specification in the presence of two subscribing witnesses.

FRANK J. DUTCHER.

Witnesses:
WM. J. WOODS,
E. D. BANCROFT.